US006098228A

United States Patent [19]

Chang

[11] Patent Number: 6,098,228

[45] Date of Patent: Aug. 8, 2000

[54] POOL CLEANER DIAPHRAGM VALVE

[76] Inventor: Paul C. Chang, 2473 San Saba St., Tustin, Calif. 92782

[21] Appl. No.: 09/251,871

[22] Filed: Feb. 17, 1999

[51] Int. Cl.[7] ................................ E04H 4/16; F17D 3/00

[52] U.S. Cl. ........................................ 15/1.7; 137/624.14

[58] Field of Search ............................... 15/1.7; 137/110, 137/112, 624.14; 210/169

[56] References Cited

U.S. PATENT DOCUMENTS

| | | | |
|---|---|---|---|
| 4,642,833 | 2/1987 | Stoltz et al. . | |
| 4,742,593 | 5/1988 | Kallenback . | |
| 4,761,848 | 8/1988 | Hofmann | 15/1.7 |
| 4,807,318 | 2/1989 | Kallenback . | |
| 5,265,297 | 11/1993 | Gould et al. . | |
| 5,315,728 | 5/1994 | Atkins . | |
| 5,384,928 | 1/1995 | Khoury . | |
| 5,450,645 | 9/1995 | Atkins | 15/1.7 |
| 5,634,229 | 6/1997 | Stoltz . | |
| 5,655,246 | 8/1997 | Chang . | |
| 5,794,293 | 8/1998 | Hoffinger . | |
| 5,992,451 | 11/1999 | Change | 15/1.7 |

FOREIGN PATENT DOCUMENTS

| | | |
|---|---|---|
| 2172195 | 9/1986 | United Kingdom . |

*Primary Examiner*—Robert J. Warden, Sr.
*Assistant Examiner*—Andrew Aldag
*Attorney, Agent, or Firm*—Gordon K. Anderson

[57] ABSTRACT

A diaphragm valve for a pool cleaner which utilizes a conventional cleaning head (30) attached with a mounting foot (32) to a cleaning disc (34). A screen (36) is inserted into the foot and an outer sleeve (38) is mounted within the head leaving a gap (40) in between. A restricting jacket (56) is slideably mounted on the sleeve and is urged into a position that restricts a water flow path from the gap, by an adjustable bypass valve (68) superimposed on the jacket. A compression spring (96) maintains the jacket position and a valve diaphragm (98) receives pool water from a pool pumping system and oscillates open and closed causing the cleaner to be propelled by a hydraulic pulsation. When the diaphragm is momentarily closed the bypass valve permits the jacket to be slid to an open position by negative pressure of pool water bypassing the diaphragm permitting full water flow through the cleaner.

11 Claims, 4 Drawing Sheets

POOL CLEANER DIAPHRAGM VALVE

TECHNICAL FIELD

The present invention relates to valves for pool cleaners in general. More specifically, to a diaphragm valve including a bypass system for a submersible pulsating pool cleaner.

BACKGROUND ART

Previously, many types pool cleaning devices have been used in endeavoring to provide an effective means for producing a momentary interruption of the pool pump intake flow, thereby propelling the cleaner on the bottom of a swimming automatically removing debris and foreign matter by the suction of the pool pump.

Prior art has, in the past, utilized valves that cause the interruption of pool water flow due to the kinetic energy of the water transferring linear force to the valve using the inertia of the fluid, promoting linear movement of the cleaner by its alternating pulsation. Various types of valves have been employed in prior art for this function, including flexible diaphragms, flappers, flexible jaws, reeds, bellows, balls, elastomeric jaws, and the like. It should be noted that these devices, developed in the past, all use the suction flow created by conventional swimming pool filtration equipment. Water flow under negative pressure is intermittently interrupted by the internal valve mechanism resulting in a ungilating movement of the cleaner in a random fashion across the bottom and radial sides of a swimming pool.

A search of the prior art did not disclose any patents that read directly on the claims of the instant invention, however, the following U.S. patents are considered related:

| Patent No. | Inventor | Issue Date |
|---|---|---|
| 4,624,833 | Stoltz et al | Feb. 17, 1987 |
| 4,742,593 | Kallenback | May 10, 1988 |
| 4,807,318 | Kallenback | Feb. 28, 1989 |
| 5,265,297 | Gould et al | Nov. 30, 1993 |
| 5,315,728 | Atkins | May 31, 1994 |
| 5,384,928 | Khoury | Jan. 31, 1995 |
| 5,634,229 | Stoltz | Jun. 3, 1997 |
| 5,655,246 | Chang | Aug. 12, 1997 |
| 5,794,293 | Hoffinger | Aug. 18, 1998 |

Stoltz et al, in U.S. Pat. No. 4,624,833, teaches a valve assembly with a flexible diaphragm with means to control the pressure within the diaphragm and chamber in between, causing it to automatically contract and expand.

U.S. Pat. No. 4,742,593, issued to Kallenback, is for a valve member having a tubular body of flexible material. The body is collapsed in the absence of pressure and has ribbing on each side of the body for reinforcement.

U.S. Pat. No. 4,807,318 of Kallenback teaches an automatic pool cleaner using a tubular axially resilient diaphragm in which one end is closed and the other is attached with a hose to a pool filtration system.

Gould et al, in U.S. Pat. No. 5,265,297, and Stoltz, in U.S. Pat. No. 5,634,229, disclose a valve having jaw-like lips of a flexible material biased in an open position by its inherent elasticity and resiliency. The lips close under negative pressure and reopen by the material establishing its inherent memory.

Atkins U.S. Pat. No. 5,315,728 is for a pool cleaner that may accommodate a variety of diaphragms of different length. The inner tube may be alternatively positioned relative to a cantilever ring and body achieving the adjustability desired.

U.S. Pat. No. 5,384,928, issued to Khoury, teaches a mushroom shaped annular flexible component of resilient deformable material as the valve for a pool cleaner.

U.S. Pat. No. 5,655,246, issued to Chang, is my prior art upon which the improvement in the valve itself is based. Previously, the valve consisted of a pair of opposed deflecting reeds, each having a fixed reed and a movable reed. The fixed reed was connected to the body on one end with a stud, and the other secured to the movable reed through an elongated slot. The spring action of the combination created a double action movement flexing the reeds into a bow shape simultaneously by virtue of their combined spring action. The flow of water is impeded by the reed valve due to the shock wave or water hammer when the opposed movable reeds are drawn together at their distal ends. The present invention replaces this valve with a diaphragm type, along with full flow bypass capabilities.

Hoffinger's U.S. Pat. No. 5,794,293 teaches a wedge that moves between two openings in a plenum, so as to alternatively cover one of the two openings, resulting in mechanical movement of the device.

DISCLOSURE OF THE INVENTION

The use of self-propelled cleaning devices for domestic swimming pools has been widely accepted throughout the world, however, there are some limitations which detract from their overall capabilities.

The main problem in most pool cleaning devices is the restrictive water flow rate in which the flow must be regulated to a specific volume in order for the valve to function properly. As an example of this limitation, the so-called "BARACUDA", known by its registered tradename, including the alpha series manufactured by Baracuda International Corporation of Fort Lauderdale, Fla. require the use of a "FLOW KEEPER" TM valve that limits the flow to the cleaner to a maximum of 20 gallons per minute (1.26 L/S). This company even provides a flow meter, called a "POOL PULSE" by its registered tradename, to adjust the flow to it's pool cleaner to make sure the maximum flow is not exceeded. The so-called JANDY VAC pool cleaner, manufactured by Jandy Industries of Novato, Calif., protected by U.S. Pat. No. 5,265,297 and U.S. Pat. No. 5,337,433, requires a specific flow of 22 gallons per minute (1.4 L/S) to start, forcing the mouth or valve to close for the first time, and 14 gallons per minute (0.88 L/S) to continue operation. In order to adjust the flow rate a regulating device in the form of a bypass flow regulating valve must be added that limits the flow to the cleaner and bypasses the balance of the pumps capabilities directly back into the pool. This means that only a small portion of the pumps potential may be utilized. As an example, most pumps handle from 60 to 80 gallons per minute (3.8 to 5 L/S) total flow at the pressure resistance found in typical piping arrangements and filter system restrictions. In this instance 22–14 gallons per minute (1.4 to 0.88 L/S) are used for cleaning and the balance of from 38 to 66 gallons per minute (2.4 to 4.2 L/S) are bypassed and completely wasted.

The instant improvements utilize an integral bypass arrangement that overcomes this problem and, therefore, is a primary object of the invention. This improvement permits the full water flow of the pump to enter the cleaner and a commercially available diaphragm receives the initial flow of approximately 20 gallons per minute (1.26 L/S) then closes, causing an integral spring loaded bypass valve to open and circumvent the diaphragm permitting the balance of the water to flow through the pool cleaner. This diaphragm valve is well known and has proven effective in the low flow application and provides the desired movement of the, cleaner by pressure cycling, again used extensively by those skilled in the art of pool cleaning apparatus.

An important object of the invention is in its ability to be used within many different types of pool cleaners employing a variety of actuating valves, as most cleaners use a hollow cleaning head, the configuration could be altered with minor revisions to receive the improved valve without changing the mounting foot, cleaning disc or piping arrangement.

Another object of the invention overcomes problems inherent in the existing bypass systems, including a narrow flow range of operation required by prior art. It is possible that the pool cleaner may become stuck in the shut position if the flow rate exceeds the limitations or stays open under low flow conditions. These abnormalities may develop if the water level in the filter tank becomes low and, a differential of 2 or 3 gallons per minute (0.13 or 0.19 L/S) exists on initial start-up, lasting up to 2 or 3 minutes due to an empty tank, or if the level has been decreased by a lapsed time interval of operation.

Still another object of the invention is that the valve assembly is unaffected by local power characteristics. During peak periods when electrical usage is at its greatest, such as summertime when the use of cooling and ventilating equipment is maximized, the line voltage from the network is reduced, which in turn causes the filter pump to operate at a slightly lower speed. As the speed of a pump is basically proportional to its flow, this reduction may inadvertently cause the cleaner valve to become inoperative and cease to be propelled. This condition may cause the cleaner to rub against the pool wall in one place and in vinyl lined pools this continuous rubbing action could cause sufficient wear in one spot as to eventually abrade the material until it wears a hole, resulting in a leak. While other pool materials are not as susceptible to leakage, a worn spot may later attract the cleaner and cause more wear when the device is returned to its normal operation, even to the extent that it may be stuck in the abraded spot and fail to clean the balance of the pool.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment.

Figure 1:
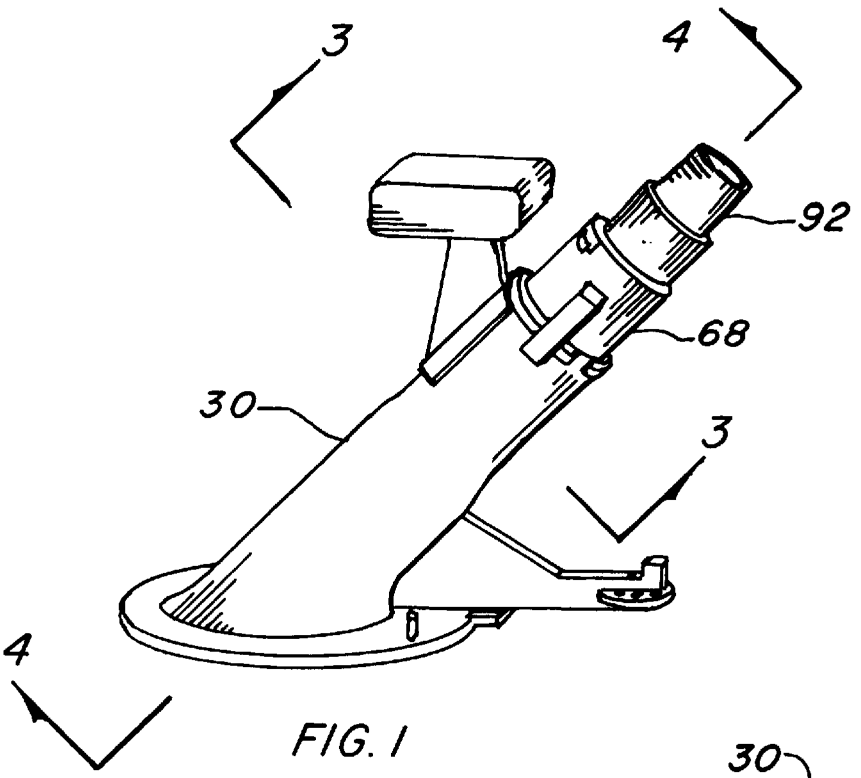
FIG. 1 is a partial isometric view of the preferred embodiment.
Figure 2:
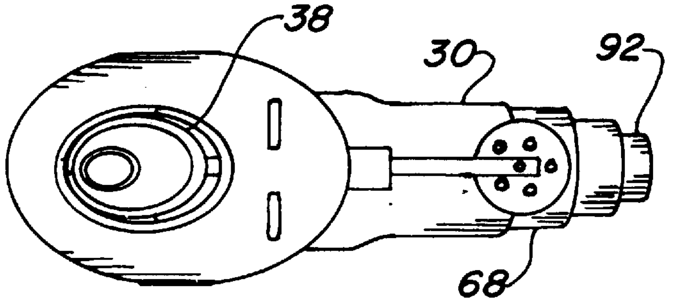
FIG. 2 is a bottom view of the preferred embodiment.
Figure 3:
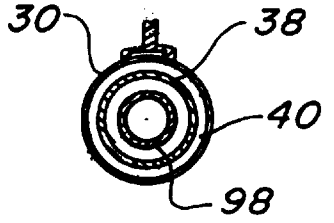
FIG. 3 is a cross-sectional view taken along lines 3—3 of FIG. 1 illustrating the gap between the sleeve and the cleaning head.
Figure 4:
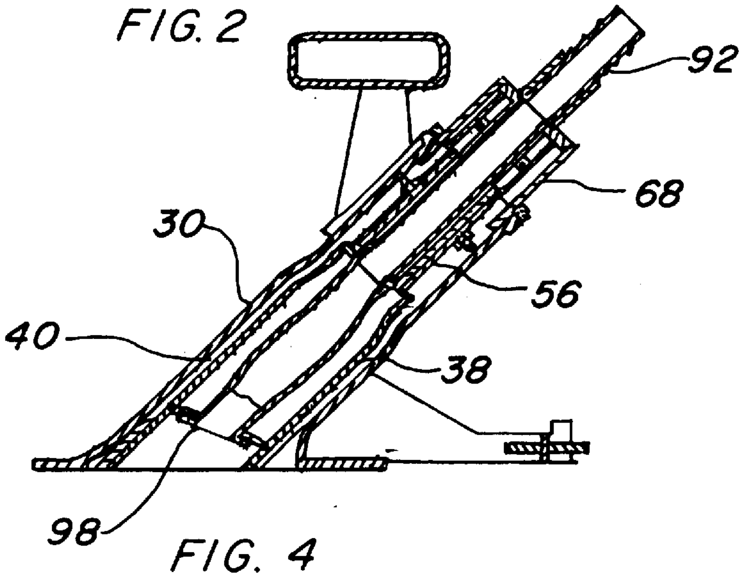
FIG. 4 is a cross-sectional view taken along lines 4—4 of FIG. 1 illustrating the internal structure.
Figure 5:
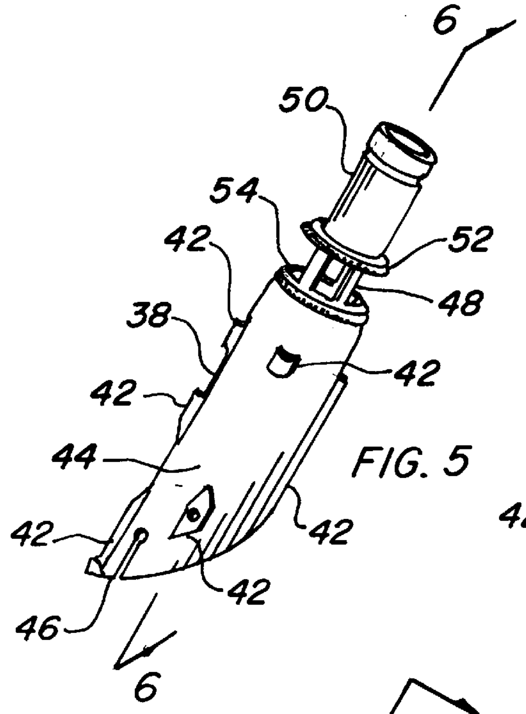
FIG. 5 is a partial isometric view of the outer sleeve completely removed from the invention for clarity.
Figure 6:
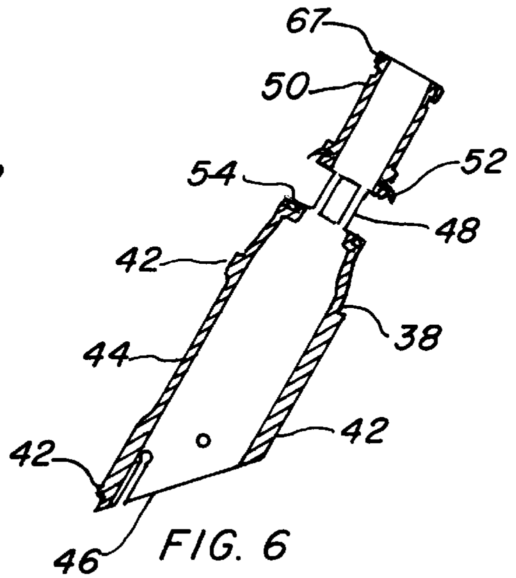
FIG. 6 is a cross-section view taken along lines 6—6 of FIG. 5.
Figure 7:
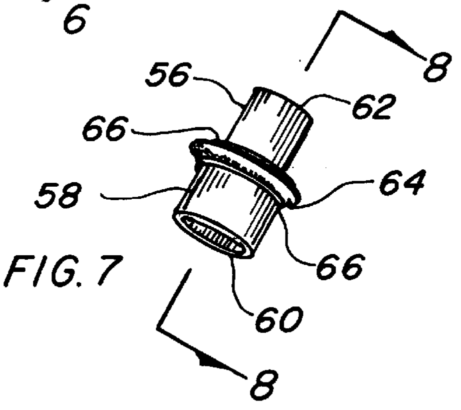
FIG. 7 is a partial isometric view of the restricting jacket completely removed from the invention for clarity.
Figure 8:
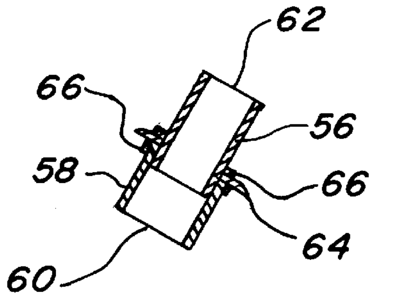
FIG. 8 is a cross-section view taken along lines 8—8 of FIG. 7.
Figure 9:
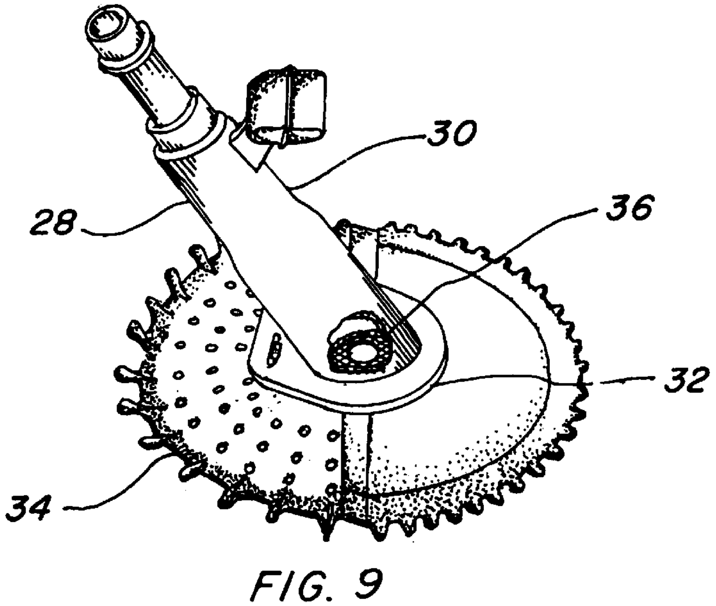
FIG. 9 is a partial isometric view of the typical prior art pool cleaning head attached to a finned disc with a mounting foot and the head cut-away to illustrate the screen in the foot.
Figure 10:
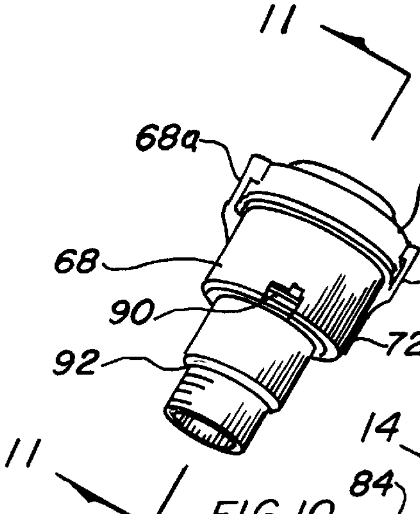
FIG. 10 is a partial isometric view of the adjustable bypass valve completely removed from the invention for clarity.

The preferred embodiment, as shown in FIGS. 1 through 25, is comprised of a diaphragm valve for a pulsating submersible pool cleaner 28 that includes a flanged hollow cleaning head 30 attached with a mounting foot 32 to a cleaning disc 34. The cleaning head 30 may be of any type known in the art as long as it is hollow and it may be attached to the cleaning disc 34 by any practical means, however, a mounting foot 32 is most commonly used. FIG. 9 illustrates such a combination that is necessary to make the invention function properly, however, it should be realized that this configuration, as shown in both FIGS. 9 and 1, are only representative, as other structural forms may be used with equal utility. Further, the disc 34 is illustrated having fins, however, again, any disc may be used with equal dispatch, including the flat or brush type also well known in the art.

Figure 25:
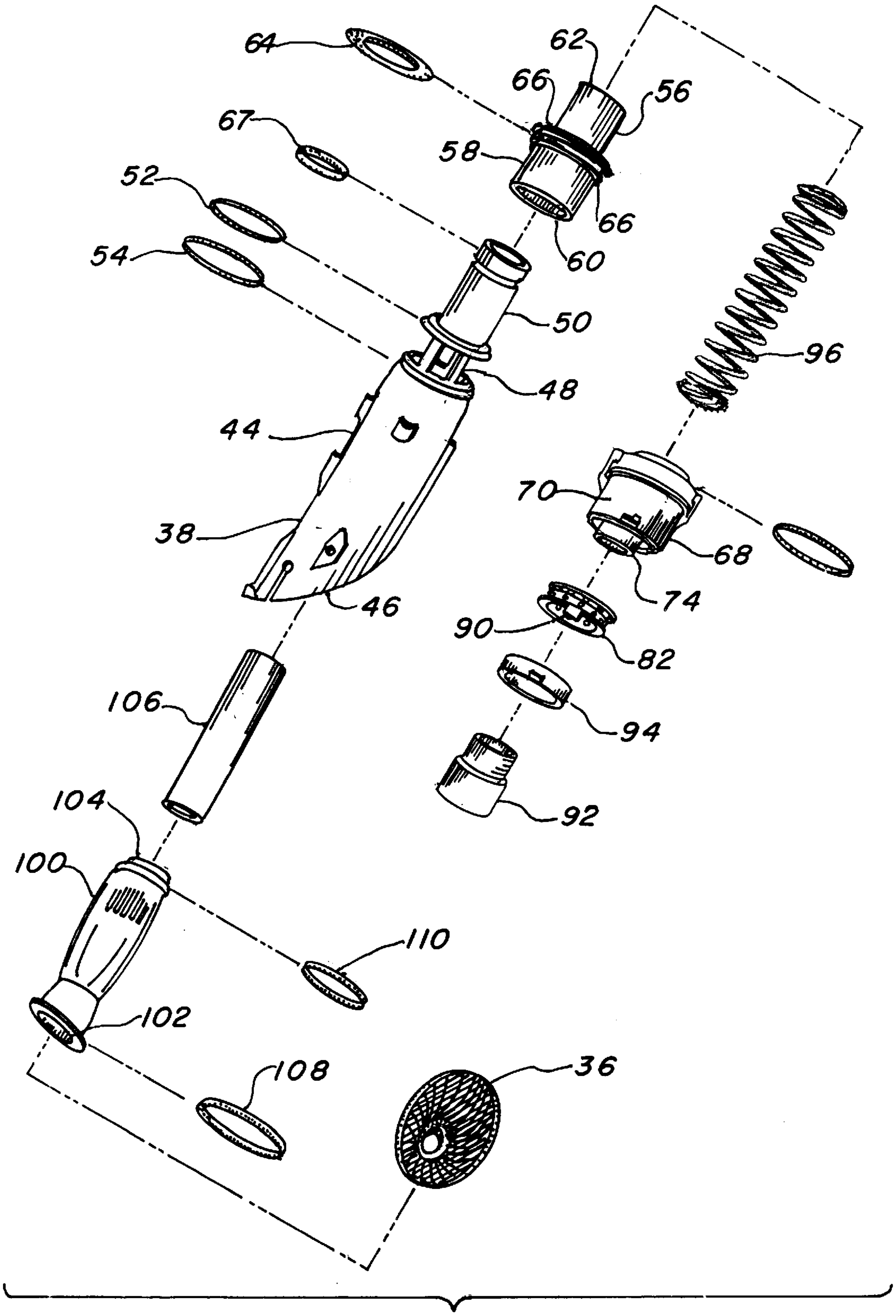
FIG. 25 is an exploded view of the preferred embodiment.

A screen 36 is attached to the pool cleaner downstream of the valve mechanism, preferably within the mounting foot 32, as shown in FIG. 9 and by itself in FIG. 25. The screens function is to protect the cleaner 28 from ingesting extraneous debris through the bypass path while allowing larger pieces to flow through the valve itself. The screen 36 is funnel shaped and has a hole in the middle for through flow by way of the valve and is constructed from a stainless steel mesh size from Number 7 to Number 14, which has a wire diameter of from 0.035 inch (0.89 mm) to 0.010 inch (0.25 mm) and an opening of from 0.061 inch (1.55 mm) to 0.108 inch (2.74 mm) respectively. It has been found that a Number 10 mesh having a wire diameter of 0.018 inch (0.46 mm) is ideal for the application.

The diaphragm valve consists of an outer sleeve 38 mounted within the pool cleaning head 30 and is configured to allow a gap 40 between the sleeve 38 and head 30. Spacers 42 on the sleeves outer surface supply this structure and maintain the necessary clearance. This sleeve 38 is shown by itself in FIGS. 5, 6 and 25 and includes a sleeve body 44 with an enlarged inlet portion 46, a sealed cage opening 48 and an outlet portion 50. The cage opening is ultimately sealed by an outer sleeve lip seal 52 retained by a pair of integral flanges on the upstream side of the cage opening and an outer sleeve compression gasket 54 on the downstream side of the opening.

A slidable restricting jacket 56 is positioned upon the outer sleeve outlet portion for constricting the flow of pool water from the gap 40 between the outer sleeve 38 and the cleaning head 30. The jacket 56 is comprised of a restrictor body 58 with a first end 60 and a second end 62 with the first end larger in diameter than the second end. A restricting jacket lip seal 64 is compressed between a pair of integral flanges 66. The body first end 60 slips over the outer sleeve lip seal 52 and contiguously engages the compression gasket 54. The second end 62 of the restrictor body slides over the outlet portion 50 of the outer sleeve 38. This relationship with the outer sleeve permits the cage opening 48 to be completely sealed shut when the restricting jacket 56 is slid toward the inlet portion 46 and butted onto the compression gasket 54, or it may be completely open and uncovered when slid in the opposite direction. It may be clearly seen that when the slidable restricting jacket 56 is slid open, the flow path for the pool water is unrestricted providing full flow through the gap 40 into the outlet portion of the outer sleeve 38, or normally shut off disallowing any bypass water to flow. The restricting jacket lip seal 64 seals onto the hollow cleaning head 30 diverting the flow through the cage opening 48. An end seal gasket 67 is mounted over outlet portion 50 of the body 44 sealing against the jacket 56 when the jacket is slid into its open position uncovering the cage openings 48.

Figure 11:
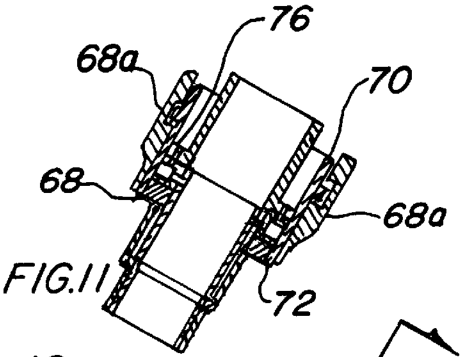
FIG. 11 is a cross-sectional view taken along lines 11—11 of FIG. 9.
Figure 12:
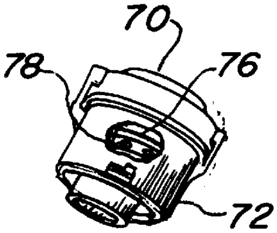
FIG. 12 is a partial isometric view of the bypass valve casing completely removed from the invention for clarity.
Figure 13:
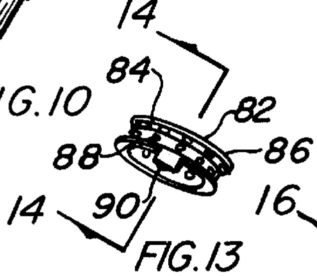
FIG. 13 is a partial isometric view of the adjustment spool completely removed from the invention for clarity.
Figure 15:
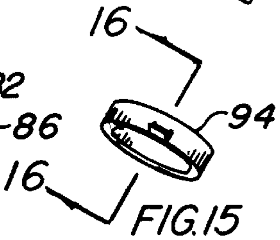
FIG. 15 is a partial isometric view of the retaining ring.
Figure 17:
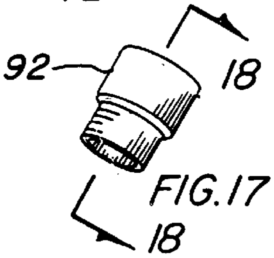
FIG. 17 is a partial isometric view of the swivel adapter completely removed from the invention for clarity.
Figure 14:
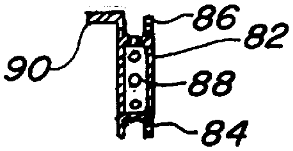
FIG. 14 is a cross-sectional view taken along lines 14—14 of FIG. 13.
Figure 16:
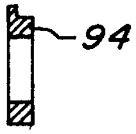
FIG. 16 is a cross-section view taken along lines 16—16 of FIG. 15.
Figure 18:
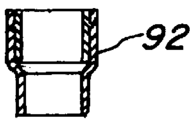
FIG. 18 is a cross-section view taken along lines 18—18 of FIG. 17.
Figure 19:
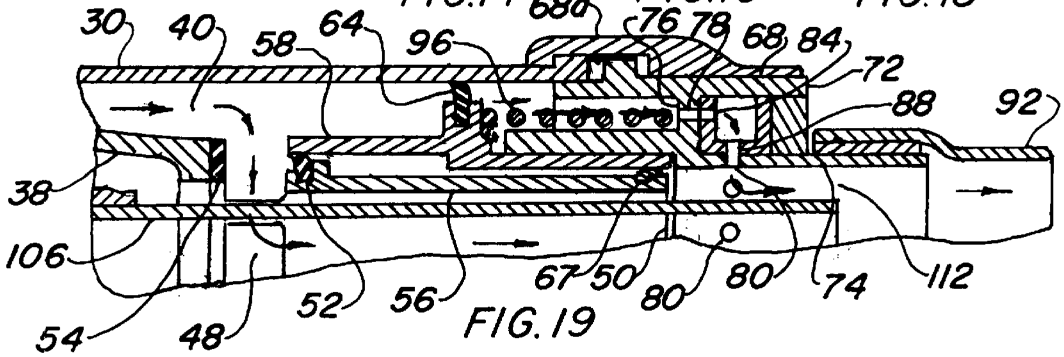
FIG. 19 is a fragmentary cross-sectional view of the invention illustrating the bypass flow path with directional arrows.

An adjustable bypass valve 68 is superimposed onto the restricting jacket second end 62 and held in place with integral clips 68*a*, as illustrated, or with fasteners, such as screws, both well known in the art. This valve 68 provides regulation as to the negative pressure and flow required to slide open the restricting jacket, as not all pool pumping systems or pumps themselves produce the same flow and pressure characteristics. The bypass valve 68 by itself is depicted in FIGS. 10 through 18 and consists of a casing 70 having an outer shell 72 and a stepped inner shell 74 that is connected in the center with a baffle 76 having a number of baffle slots 78, as illustrated in FIGS. 11, 12 and 19. The inner shell 74 contains a number of inner shell holes 80 abutting the baffle 76, creating a flow path through the inner shell 74. An adjustment spool 82 having peripheral slots 84 on an upstanding flange 86 compliments the baffle slots 78 and a number of spool holes 88 interface with the inner shell holes 80, such that when the holes and slots are in alignment a flow path is created. When the holes and the slots are not side by side there is no flowpath and no water is allowed to be bypassed. Adjustment means within the outer shell 72 and the spool 82 consist of a lever 90 formed integrally with the spool 82 extending outwardly through the outer shell 72. The spool may therefore be manually rotated mismatching the holes 88 and slots 84 with the baffle slots 78 and shell holes 80 shutting off the flow path or adjusted to permit no flow through the bypass valve 68 with any desired position achievable in between. A swivel adapter 92 is attached to the inner shell 74 with a tight slip fit for attachment of a hose from the pool pumping system. The adapter 92 is double walled and well known in the art. A retaining ring 94, shown in FIGS. 15 and 16, interfaces with the spool 82 and adapter 92, as illustrated in FIG. 19, for holding the spool in place while still allowing it to be manually rotated.

FIG. 19 illustrates pictorially the flow path using directional arrows. Normally pool water is under negative pressure when the diaphragm valve is closed, causing both negative pressure in the gap 40 between the outer sleeve 38 and the cleaning head 30 and also in the outlet portion 50 of the sleeve body 44. A flow path is formed through the inner shell holes 80 into the adjustment spool 82 and on through the spool holes 88 then into a chamber formed between the cleaning head 30 and the restricting jacket lip seal 64. This negative pressure pulls the seal and attached jacket 56, under spring pressure, uncovering the cage opening 48 permitting an open pathway for water to flow from the gap 40 through the cage and on through the pool cleaner to the pool pumping system pictorially illustrated in this open position in FIG. 19 with arrows showing the direction of the water flow.

A compression spring 96 is placed between the lip seal 64 on the jacket 56 and the baffle 76 on the bypass valve 68 as shown in FIG. 19, also by itself in FIG. 25. This spring 96 urges the jacket to interface with the compression gasket 54 on the sleeve body 44 closing over the cage opening 48 such that no flow path is formed from the gap 40 and no pool water is bypassed. When negative pressure is permitted to draw the jacket 56 away from the gasket 54, the spring 96 is compressed permitting bypass until negative pressure is relieved returning the spring to its normally extended position.

Figure 20:
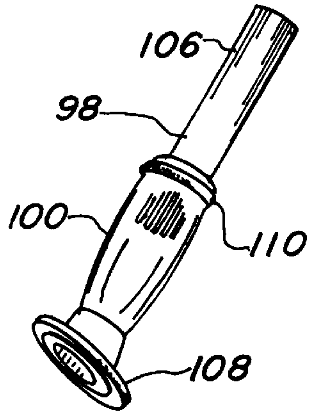
FIG. 20 is a partial isometric view of the valve diaphragm completely removed from the invention for clarity.
Figure 21:
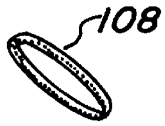
FIG. 21 is a partial isometric view of the diaphragm sealing gasket completely removed from the invention for clarity.
Figure 22:
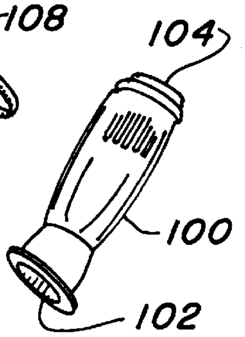
FIG. 22 is a partial isometric view of the resilient tubular diaphragm completely removed from the invention for clarity.
Figure 23:
FIG. 23 is a partial isometric view of the diaphragm collar completely removed from the invention for clarity.
Figure 24:
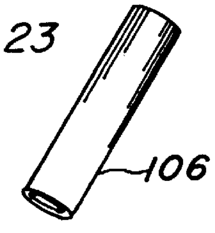
FIG. 24 is a partial isometric view of the inner conduit completely removed from the invention for clarity.

To complete the invention a valve diaphragm 98 is disposed within the outer sleeve 38 for directly receiving pool water and oscillating between an open and a closed position causing the pool cleaner to produce a hydraulic cyclic pulsation. The valve diaphragm 98 is illustrated in FIG. 20 and its components in FIGS. 21 through 24 and consists of a resilient tubular diaphragm 100 having a first end 102 and a second end 104, with an inner conduit 106 attached onto the diaphragm second end 104. A collar 108 is slipped over the diaphragm first end 102 and held in place by an integral flange. A resilient diaphragm sealing gasket 110 is slipped over the diaphragm first end 102 and held in place by an integral flange. A resilient diaphragm sealing gasket 110 is slipped over the diaphragm second end 104 and retained by an internal groove integral with the diaphragm 100. The valve diaphragm 98 is inserted into the outer sleeve 38 with the collar 108 sealing against the inner surface of the inlet portion 46 of the sleeve body 44 and the sealing gasket 110 interfacing contiguously with a tapered transitional area of the body 44 between the inlet 46 and outlet 50 portions. The inner conduit 106 is smaller in diameter than the outlet portion 50 of the body 44 creating an orifice 112 therebetween for the passage of bypass water flow.

It may be noted that almost any type of tubular diaphragm known in the art may be used, however, it has been found that the part number 81700 diaphragm manufactured by Baracuda International Corporation of Fort Lauderdale, Fla. is ideal for the application and is described in and protected by U.S. Pat. No. 4,742,593 discussed earlier.

In operation a typical pool cleaner 28, as illustrated in FIG. 9, is attached by a hose to the pool pump circulating and cleaning system and submerged into the bottom of a swimming pool. The pool pump draws water through the cleaner valve diaphragm 98 until a flow of from approximately 18 gallons per minute (1.14 L/S) to 20 gallons per minute (1.26 L/S) causes the tubular diaphragm 100 to collapse, impeding the flow from the pump. As conventional pool pumps handle a much larger flow, up to 80 gallons per minute (5.05 L/S), this excess flow is accommodated by the integral bypass system of the instant invention. Water then flows through the flow path, as previously described, and negative pressure, up to 10 to 12 inches of mercury (25.4 to 30.48 cm), is sufficient to slide the jacket 56 away from the cage openings 48 bypassing the full flow of water. As pool pumps differ in their output characteristics, the valve may be adjusted with the lever 90 on a trial and error basis to find the optimum set point to balance the flow. It has been found that the tubular diaphragm 100 oscillates between open and closed from 20 to 15 gallons per minute (1.26 to 0.95 L/S) flow on a typical 80 gallon per minute (5.05 L/S) system and the bypass valve 68 cycles open and close at a negative pressure of 10 to 15 inches of mercury (25.4 to 38.1 C/M). It will be clearly seen that the invention has overcome the problems of flow by using a conventional tubular diaphragm and a built-in bypass system that permits the pool cleaner to operated under the usual hydraulic cyclic pulsation's and integrally handle the full flow of water, increasing the efficiency of the cleaner while not affecting its motivational capabilities.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. A full flow diaphragm valve for a pulsating submersible pool cleaner having a flanged hollow cleaning head attached with a mounting foot to a cleaning disc comprising;

a screen disposed within a pool cleaner mounting foot for protecting the cleaner from ingesting extraneous debris, an outer sleeve mounted within a hollow cleaning head, said sleeve configured to have a gap between said sleeve and the hollow cleaning head, a slidable restricting jacket disposed upon the outer sleeve for both bypassing and constricting flow of pool water from the gap between the outer sleeve and the cleaning head, an adjustable bypass valve superimposed onto the restricting jacket, having means to adjust negative pressure at which a flow of pool water is circumvented through said gap, a compression spring between the jacket and the bypass valve for sealing and maintaining jacket position relative to the outer sleeve, and a valve diaphragm having an inner conduit disposed within the outer sleeve for directly receiving pool water and oscillating between an open and closed position causing a pool cleaner to produce a hydraulic cyclic pulsation, further, when the diaphragm is momentarily closed said bypass valve permits the jacket to be slid to an open position by negative pressure of pool water allowing bypassing the diaphragm, granting full flow of pool water through a pool cleaner.

2. The diaphragm valve for a pulsating submersible pool cleaner as recited in claim 1 wherein said screen further comprising, a stainless steel mesh size from number 7 to number 14 formed in funnel shape.

3. The valve for a pulsating submersible pool cleaner as recited in claim 1 wherein said outer sleeve further comprising, a sleeve body having an enlarged entrance portion and a sealed cage opening.

4. The diaphragm valve for a pulsating submersible pool cleaner as recited in claim 3 wherein said sleeve body further comprising, an exit portion and said cage opening is sealed by an outer sleeve lip seal retained between a pair of flanges on the exit portion at an upstream side of the cage opening and an outer sleeve compression gasket on a downstream side of the cage opening.

5. The diaphragm valve for a pulsating submersible pool cleaner as recited in claim 1 wherein said slidable restricting jacket further comprising, a restrictor body having a first end and a second end with the first end larger in diameter than the second end and a restricting jacket lip seal contiguously engaged by a pair of integral flanges said first end slideably mating with the sleeve body covering the cage opening when slid thereupon.

6. The diaphragm valve for a pulsating submersible pool cleaner as recited in claim 1 wherein said adjustable bypass valve further comprising, a casing having an outer shell and a stepped inner shell connected in the center with a baffle having a plurality of baffle slots therein, said inner shell further having a plurality of inner shell holes abutting the baffle creating a flow path through the inner shell, an adjustment spool having peripheral slots on an upstanding flange complementing the baffle slots and a plurality of spool holes interface with the inner shell holes such that when the holes and slots are in alignment a flow path is created, adjustment means within the outer shell and also the spool for regulating the negative pressure required to slide open the restricting jacket, a swivel adapter intimately embracing the inner shell for attachment of a hose from a pool pump, and a retaining ring interfacing with the spool and the swivel adapter for retaining the spool in place in a rotatably alterable manner.

7. The diaphragm valve for a pulsating submersible pool cleaner as recited in claim 1 wherein said valve diaphragm further comprising, a resilient tubular diaphragm having a first end and a second end, said inner conduit attached into the diaphragm second end, a collar disposed upon the diaphragm first end and a diaphragm sealing gasket over the diaphragm second end, with the valve configured to be insertable within the outer sleeve.

8. A full flow diaphragm valve for a pulsating submersible pool cleaner having a flanged hollow cleaning head attached with a mounting foot to a cleaning disc comprising;

a outer sleeve mounted within a hollow cleaning head, said sleeve configured to have a gap between said sleeve and the hollow cleaning head, a slidable restricting jacket disposed upon the outer sleeve for both bypassing and constricting flow of pool water from the gap between the outer sleeve and the cleaning head, an adjustable bypass valve with a restricting jacket, having means to adjust negative pressure at which a flow of pool water is circumvented through said gap, a valve diaphragm having an inner conduit disposed within the outer sleeve for directly receiving pool water and oscillating between an open and a closed position causing a pool cleaner to produce a hydraulic cyclic pulsation, further, when the diaphragm is momentarily closed said bypass valve slides the jacket to an open position allowing water to bypass the diaphragm permitting full flow of pool water.

9. The diaphragm valve for a pulsating submersible pool cleaner as recited in claim 8 further comprising, a funnel shaped screen disposed within a pool cleaner mounting foot for protecting the cleaner from ingesting extraneous debris.

10. A full flow diaphragm valve for a pulsating submersible pool cleaner having a flanged hollow cleaning head attached with a mounting foot to a cleaning disc comprising;

a outer sleeve mounted within a hollow cleaning head, said sleeve configured to have a gap between said sleeve and the hollow cleaning head, an adjustable bypass valve having a restricting jacket and means to adjust negative pressure at which a flow of pool water is circumvented through said gap, and a valve diaphragm having an inner conduit disposed within the outer sleeve for directly receiving pool water and oscillating between an open and a closed position causing a pool cleaner to produce a hydraulic cyclic pulsation, further, when the diaphragm is momentarily closed said bypass valve slides the jacket to an open position allowing water to bypass the diaphragm permitting full flow of pool water.

11. The diaphragm valve for a pulsating submersible pool cleaner as recited in claim 10 further comprising a screen disposed within a pool cleaner mounting foot for protecting the cleaner from ingesting extraneous debris.

* * * * *